United States Patent
Daniloff et al.

(10) Patent No.: US 11,767,459 B2
(45) Date of Patent: Sep. 26, 2023

(54) LOW DENSITY OIL-BASED WELLBORE FLUIDS AND METHODS THEREOF

(71) Applicant: Schlumberger Technology Corporation, Sugar Land, TX (US)

(72) Inventors: Roger Daniloff, Sandnes (NO); Arne Askø, Sandnes (NO); Nicholas Hilbig, Sandnes (NO); Jerome Pic, Tananger (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 167 days.

(21) Appl. No.: 17/287,378

(22) PCT Filed: Oct. 22, 2019

(86) PCT No.: PCT/US2019/057329
§ 371 (c)(1),
(2) Date: Apr. 21, 2021

(87) PCT Pub. No.: WO2020/086513
PCT Pub. Date: Apr. 30, 2020

(65) Prior Publication Data
US 2021/0395597 A1 Dec. 23, 2021

Related U.S. Application Data

(60) Provisional application No. 62/749,634, filed on Oct. 23, 2018.

(51) Int. Cl.
*C09K 8/36* (2006.01)
*E21B 43/16* (2006.01)
*E21B 21/00* (2006.01)

(52) U.S. Cl.
CPC .............. *C09K 8/36* (2013.01); *E21B 21/003* (2013.01); *C09K 2208/18* (2013.01)

(58) Field of Classification Search
None
See application file for complete search history.

(56) References Cited

U.S. PATENT DOCUMENTS

| | | | |
|---|---|---|---|
| 10,626,314 B1 * | 4/2020 | Bennett | C09K 8/035 |
| 2005/0124499 A1 | 6/2005 | Shinbach et al. | |
| 2015/0024975 A1 * | 1/2015 | Wagle | C09K 8/36 507/117 |
| 2017/0247596 A1 | 8/2017 | May et al. | |

FOREIGN PATENT DOCUMENTS

| | | |
|---|---|---|
| CN | 106318351 A | 1/2017 |
| CN | 106833566 A | 6/2017 |
| CN | 106987239 A | 7/2017 |

* cited by examiner

*Primary Examiner* — Charles R Nold
(74) *Attorney, Agent, or Firm* — Garry Brown, Jr.

(57) ABSTRACT

A wellbore fluid may include an oleaginous continuous phase; a non-oleaginous discontinuous phase; an emulsifier stabilizing the non-oleaginous phase within the oleaginous phase; a low density material selected and in an amount to result in a specific gravity of the wellbore fluid that is less than 0.83; and at least one rheology modifier selected to suspend the low density material within the wellbore fluid.

11 Claims, 1 Drawing Sheet

LOW DENSITY OIL-BASED WELLBORE FLUIDS AND METHODS THEREOF

CROSS-REFERENCE TO RELATED APPLICATIONS

The present application claims priority to U.S. Provisional Application Ser. No. 62/749,634, filed Oct. 23, 2018, which is incorporated herein by reference in its entirety.

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

In most rotary drilling procedures, the drilling fluid takes the form of a "mud," i.e., a liquid having solids suspended therein. The solids generally function to impart desired rheological properties to the drilling fluid and also to increase the density thereof in order to provide a suitable hydrostatic pressure at the bottom of the well. The drilling mud may be either a water-based or an oil-based mud.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid that includes an oleaginous continuous phase; a non-oleaginous discontinuous phase; an emulsifier stabilizing the non-oleaginous phase within the oleaginous phase; a low density material selected and in an amount to result in a specific gravity of the wellbore fluid that is less than 0.83; and at least one rheology modifier selected to suspend the low density material within the wellbore fluid.

In another aspect, embodiments of the present disclosure relate to a method that includes circulating a wellbore fluid into a wellbore, the wellbore fluid including an oleaginous continuous phase; a non-oleaginous discontinuous phase; an emulsifier stabilizing the non-oleaginous phase within the oleaginous phase; a low density material selected and in an amount to result in a specific gravity of the wellbore fluid that is less than 0.83; and at least one rheology modifier selected to suspend the low density material within the wellbore fluid.

In yet another aspect, embodiments disclosed herein relate to a method that includes drilling through a depleted reservoir with a wellbore fluid having a specific gravity less than 0.83, a plastic viscosity of less than 40 cP, and a Fann 35 dial reading at 3 rpm ranging from 2 to 6 lbs/100 ft$^2$; and ceasing drilling, wherein during ceasing, the wellbore fluid has less than a 0.1 specific gravity change in the wellbore.

Other aspects and advantages of the claimed subject matter will be apparent from the following description and the appended claims.

DETAILED DESCRIPTION

Figure 1:
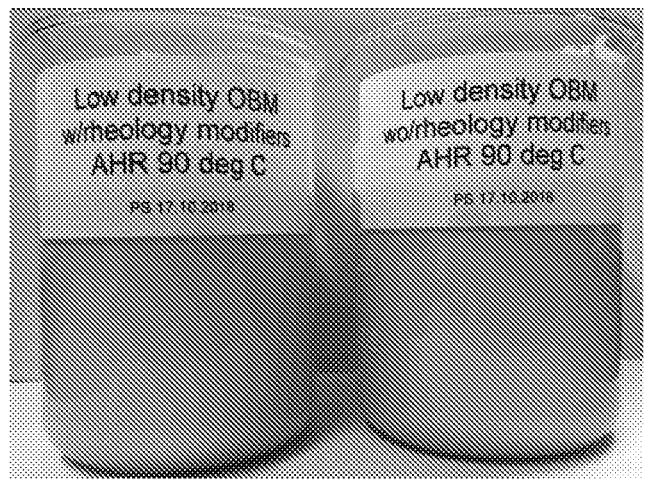
FIGS. 1-3 show comparative images (with and without rheology modifiers) of fluid stability (static aging) at 0 hours, 48 hours, and 72 hours, respectively.

In one aspect, embodiments disclosed herein relate to low density wellbore fluids, particularly oil-based wellbore fluids, and methods thereof. While wellbore fluids (and drilling fluids in particularly) usually incorporate a weighting agent to increase the density of the fluid to provide the appropriate hydrostatic pressure to prevent the ingress/egress fluids into/out of the wellbore, there are also an increasing number of situations in which conventional, densified wellbore fluids have too high of a density for the reservoir. For example, when drilling in depleted reservoirs, where the pressures are significantly lower than conventional downhole environments, there is an increasing need for fluids having a density of less than 7 pounds per gallon (ppg) or a specific gravity of less than 0.83.

Sag is generally defined as the settling of particles in the annulus of a well, which can occur when the wellbore fluid is static or being circulated. In the context of low density particles, which have a specific gravity less than the fluid in which the particles are suspended, the particles do not settle (or sink) but instead rise towards the surface. However, the resulting effect is the same as when high density materials settle: the upper part of a wellbore will lose mud density, which lessens the hydrostatic pressure in the hole, so an influx (a kick) of formation fluid can enter the well which may damage the well or lead to the loss of the well. Conventionally, operators attempt to increase the viscosity of a fluid to reduce sag of high density particles. However, this approach can be problematic because the increasing pressures necessary to pump a more viscous fluid can lead to a greater risk for lost circulation when the pumping pressure exceeds that which the formation can withstand. This elevated viscosity is particularly problematic at lower temperatures where the fluid may naturally become more viscous.

In accordance with one or more embodiments of the present disclosure, the inventors have found that the incorporation of a rheology modifier may advantageously allow for the low density particles to remain suspended in the fluid, where, without the rheology modifier, the particles were otherwise rising or floating towards the top of the fluids within minutes of the fluid mixing. In such instance, the fluid exhibits a density change over the fluid column. In particular, the fluid's ability to keep the low density materials suspended may be considered in terms of the fluid's change in specific gravity (i.e., Δ s.g.) over a measured period of time. In one or more embodiments, a wellbore fluid of the present disclosure may have a Δ s.g. of less than 0.1 (or less than 0.05 s.g.) over a period of time that is at least 1 hour, 5 hours, 10 hours, 1 day, 3 days, or 7 days. Thus, by having minimal sag, the fluid may have less than a 0.1 s.g (or 0.833 ppg) change over the static period. Another way of expressing this is through a "sag factor", which is calculated for a fluid heat aged in a static cell for a period of time of at least 16 hours, by dividing the bottom density by the sum of the top and bottom densities. A sag factor of 0.5 indicates no settlement of weighting agents or rising of low density materials. In one or more embodiments of the present disclosure, a sag factor of greater than 0.46 may be achieved or greater than 0.47, 0.48, or 0.49.

Rheology modifiers may include one or more of polycarboxylic acids, polyamides, alcohol alkoxylates, amine alkoxylates, ethylene oxide/propylene oxide copolymers, or combinations thereof. One or more of the rheology modifiers may be added to the fluid in an amount ranging from 1 to 8 g/L or 2 to 5 g/L in more particular embodiments.

In an illustrative embodiment, the rheology modifier may be a poly-carboxylic fatty acid. In one or more embodiments, the poly-carboxylic fatty acids utilized in the present fluid may include a dimer poly-carboxylic C12 to C22 fatty acid, trimer poly-carboxylic C1 to C22 fatty acid, tetramer poly-carboxylic C12 to C22 fatty acid, mixtures of these acids. For example, the poly-carboxylic fatty acid may be dimeric or trimeric and therefore at least two or three carboxyl groups in the molecule. Particular dimer or trimers may include a poly-carboxylic acid derived from tall oil or other similar unsaturated long chain carboxylic acids (i.e. fatty acids) having from 12 to 22 carbons. The rheology modifier is a proprietary polyamide based rheology modifier based on a mixture of amides and amines commercially available from M-I SWACO of Houston Tex. as EMI-756.

In another illustrative embodiment, the rheology modifier may be a polyamide. When the rheology modifier is a polyamide, the polyamide may be, for example, the condensation reaction product of a C12-C22 fatty acid and a polyamine selected from the group consisting of diethylenetriamine, triethylenetetramine; and pentaethylenetetramine. Generally, the condensation product is based on one equivalent of fatty acid for each equivalent of amine present in the amine starting material.

As mentioned above, the rheology modifier may be used in order to suspend (with little floating of) the low density particles to the top of the fluid. Generally, a low density material has a specific gravity less than that of the fluid phase in which the material is suspended (such as an oil-in-water emulsion). In particular embodiments, the low density material may have a specific gravity less than each of the aqueous phase and the oleaginous phase. Based on the low specific gravity (less than the fluid phases), when added to a wellbore fluid, the low density material may be added to the wellbore fluid in amounts sufficient to reduce the density to less than 0.83, 0.8, or 0.76 sp, such as a reduction of density by at least 15%, 20%, or 30%. In one embodiment, the low density material is added in amounts sufficient to reduce the density of the mud to less than the oleaginous phase (which has a lower specific gravity than an aqueous phase emulsified therein). In another embodiment, the low density material may be present in an amount up to 175 g/L of the fluid.

The low density material may comprise any hollow microspheres of glass, ceramic or plastic that may be added to the wellbore fluid to reduce the density thereof. The compressive strength required of the microspheres used in drilling applications is dictated by the downhole pressures and extreme environments encountered during drilling as well as the conditions used to mix the wellbore fluid and pump the fluid downhole. Hollow microspheres, because of their spherical form, provide resistance to compression equally from all directions (isotropic compressive strength), and are ideally suited for this application. Generally, the microsphere may have a collapse strength of at least 4000 psi (27.6 MPa), preferably at least 5000 psi (34.5 MPa) to provide an essentially incompressible density-reducing additive.

The microspheres used may be any type of hollow spheres that are known to the art, such as glass, but may also be made of polymeric, ceramic or other materials known to the art, provided the microsphere component has sufficient physical properties to withstand the severe conditions encountered in well drilling, including collapse strength, hydrolytic stability, size, density, etc.

As the microspheres are subjected to high pressures in a well, the microspheres should have a collapse strength in excess of the anticipated pressures. Generally, the microspheres should have a burst strength in excess of 4000 psi (27.6 MPa), preferably in excess 5000 psi (34.5 MPa) as measured by ASTM D3102-78 with 10% collapse and percent of total volume instead of void volume as stated in the test. In particular embodiments, the fluid, including the microspheres maybe subjected to a pressure test of 5500 psi, whereby there is no increase in the fluid density upon exposure to the elevated pressure.

The density of the microspheres may vary from about 0.1 to 0.9 g/cm$^3$, or in the range of 0.2 to 0.7 g/cm$^3$ in more particular embodiments. One example of a suitable microsphere material is borosilicate glass, such as having a chemical composition consisting essentially of $SiO_2$, CaO, $Na_2O$, $B_2O_3$, and $SO_3$ blowing agent.

As mentioned, the low density materials (and rheology modifiers keeping the low density materials in suspension) may be particularly used in oil-based wellbore fluids. In one or more embodiments, an oil-based wellbore fluid may be an invert emulsion containing an aqueous discontinuous phase and an oil-based continuous phase. Thus, an "invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins, polydiorganosiloxanes, siloxanes or organosiloxanes), ester oils, glycerides of fatty acids, aliphatic esters, aliphatic ethers, aliphatic acetals, or other such hydrocarbons and combinations of these fluids. The concentration of the oleaginous fluid should be sufficient so that an invert emulsion forms. The concentration of the oleaginous fluid may be less than about 99% by volume of the invert emulsion. In one embodiment the amount of oleaginous fluid is from about 30% to about 95% by volume and more particularly about 40% to about 90% by volume of the invert emulsion fluid.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these. The amount of the non-oleaginous fluid is typically less than the theoretical maximum limit for forming an invert emulsion. Thus, the amount of non-oleaginous fluid is less than about 70% by volume. Preferably, the amount of non-oleaginous fluid ranges from about 1% to about 70% by volume, and more preferably from about 5% to about 60% by volume of the invert emulsion fluid.

Suitable oil-based or oleaginous fluids for use in wellbore fluids of the present disclosure may be a natural or a synthetic oil. In one or more embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In one or more embodiments, the oil-based wellbore fluid of the present disclosure may also contain an emulsifier, organophilic clays, fluid loss control agents, and bridging agents. These components will be described in greater detail below. Prior to describing the specific components in detail, it should be understood that an oil-based wellbore fluid described herein and including the components listed above and below may be formulated such that it has certain rheological properties that keeping the low density materials in suspension (avoiding a density differential) while also avoiding a fluid that is too viscous at low shear. For example, a wellbore fluid according to the present disclosure may have rheological properties including a 3 rpm dial value at 50° F. of ranging from 2-6 lbs/100 ft². Further, the fluid's plastic viscosity may be less than 40 cP.

As mentioned above, the fluid may contain one or more additives in order to form a stable emulsion and operate in as needed during drilling. In order to form an invert emulsion, at least one emulsifier may be included to stabilize the discontinuous aqueous phase within the continuous oil phase, such as in an amount ranging from 5 to 30 g/L. For example, in one or more embodiments, a fatty acid (one or more of a C10-C24 fatty acid, for example, which may include linear and/or branched, and saturated and/or unsaturated fatty acids) may be reacted with one or more ethyleneamines (e.g., ethylenediamine, diethylenetriamine, triethylenetetramine, tetraethylenepentamine) to produce an emulsifier selected from one or more of amides, polyamides, and/or amidoamines, depending, for example, on the mole ratio of the polyamine to the fatty acid. In particular embodiments, the mole ratio is selected so that an amidoamine is formed. In one or more embodiments, the emulsifier may be based on a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid (including a dimer, trimer, or tetramer) and a polyamine selected from the group consisting of diethylenetriamine, triethylenetetramine; and tetraethylenepentamine. In one or more embodiments, the emulsifier may be a blend of C15-40 polyolefins, polyamides with a molecular weight greater than 1200, and amines. Emulsifiers of the present disclosure may have an amine number in the range of 25-50. The term "amine number" refers to the ratio of the mass of potassium hydroxide which consumes exactly as much acid on neutralization as does the sample being examined, to the mass of that sample. In one or more embodiments, the emulsifier may be a polyalkenyl succinimide compound.

In one or more embodiments, the emulsifier may be an alkoxylated ether acids. In one or more embodiments, an alkoxylated ether acid is an alkoxylated fatty alcohol terminated with a carboxylic acid, represented by the following formula (III):

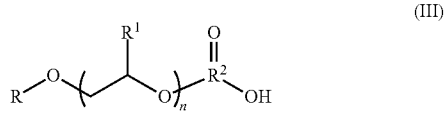

where R is $C_6$-$C_{24}$ or —C(O)$R^3$ (where $R^3$ is $C_{10}$-$C_{22}$), le is H or $C_1$-$C_4$, $R^2$ is $C_1$-$C_5$ and n may range from 0 to 20 in one or more embodiments (0 in some embodiments and 1-20 in other embodiments). Such compounds may be formed by the reaction of an alcohol with a polyether (such as poly(ethylene oxide), poly(propylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid. In a particular embodiment, the selection of n may be based on the lipophilicity of the compound and the type of polyether used in the alkoxylation. In some particular embodiments, where $R^1$ is H (formed from reaction with poly(ethylene oxide)), n may be 2 to 10 (between 2 and 5 in some embodiments and between 2 and 4 in more particular embodiments). In other particular embodiments, where $R^1$ is —CH$_3$, n may range up to 20 (and up to 15 in other embodiments). Further, selection of R (or $R^3$) and $R^2$ may also depend on based on the hydrophilicity of the compound due to the extent of polyetherification (i.e., number of n). In selecting each R (or $R^3$), $R^1$, $R^2$, and n, the relative hydrophilicity and lipophilicity contributed by each selection may be considered so that the desired HLB value may be achieved. Further, while this emulsifier may be particularly suitable for use in creating a fluid having a greater than 50% non-oleaginous internal phase, embodiments of the present disclosure may also include invert emulsion fluids formed with such emulsifier at lower internal phase amounts. In one or more embodiments, the emulsifier may be a tall oil fatty acid (TOFA) amide, such as TOFA diethanolamide. In one or more embodiments, the emulsifier may be a mono-ethanol amide, a di-ethanol amide, or an isopropanol amide. In one or more embodiments, the emulsifier may be an oleic-based amide, such as oleic acid diethanolamide or similar amides with different head groups (e.g., oleyl sarcosinate and oleyl taurate). In one or more embodiments, the emulsifier may be a polyisobutylenesuccinic anhydride.

In one embodiment, the additional emulsifier may be PRIMO-MUL, which is commercially available from M-I SWACO, Houston, Tex. In one or more embodiments, an additional emulsifier may be present in a concentration of less than about 15 lbm/bbl. In preferable embodiments, the concentration of the additional emulsifier may be from about 2 to about 8 lbm/bbl Other wellbore fluid additives may also be included in the fluid, including, but not limited to viscosifiers, bridging agents, and fluid loss control agents. Further, it is envisioned that other wellbore fluid additives may also be present depending on the particular well being drilled.

Organophilic clays, normally amine treated clays, may be useful as viscosifiers in one or more embodiments of the fluid compositions of the present disclosure. Such clays may alter the rheology of the fluid and can enhance stability of the emulsion in addition to minimizing oil separation. An organophilic clay is defined to mean a clay that is treated in any way to have an organophilic coating or surface treatment. In particular embodiments, the organophilic clay may be an organophilic sepiolite or bentonite. In one or more embodiments, untreated clays, including attapulgite, sepiolite, and/or bentonite clay may also be used as viscosifiers in addition to the organophilic clays. Other viscosifiers and gellants, such as oil soluble polymers, styrene-butadiene block polymers, polyamide resins, polycarboxylic acids and soaps may also be used in addition to the organophilic clays. The total amount of viscosifier used in the compositions may vary depending on downhole conditions, as understood by those skilled in the art. However, a total amount of less than 20 g/L may be used, including, for example, 2 to 15 g/L Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSALIG™, ECOTROL™ family of products, ONETROL-HT™, EMI 789, and NOVATECH™ F, which are all commercially available from M-I SWACO (Houston, Tex.). Fluid loss control agents may be present, for example, in the wellbore fluid in an amount less than 25 g/L, such as for example, within the range of 10-20 g/L.

Bridging agents, as known in the art, may also be used bridge across the pore throats or fractures of an exposed rock thereby building a filter cake to prevent loss of whole mud or excessive filtrate. Such typically bridging agents may include materials such as calcium carbonate, sized salt, oil-soluble resins, graphite, mica, nutshells, and fibers, etc. Bridging agents may be added in amounts ranging from 40 up to 140 g/L percent by weight of the fluid. It may be appreciated that the bridging agents may be selected to have a particle size (or particle size combination) based on the anticipated pore and/or fracture sizes of the formation. In particular, the combination of fluid loss control agents and bridging agents, may contribute to the formation of a filter cake along the wellbore walls, thereby reducing fluid loss to the formation. Specifically, the wellbore fluid may possess a fluid loss (according to HPHT testing on an API 10 micron aloxite disc at 100 C for 30 minutes) of less than 20 mL.

The present disclosure also provides a method of drilling comprising circulating a wellbore fluid down a drill string and up an annulus between the drill string and bore hole, the fluid having a microsphere component or low density material therein to in an amount sufficient to reduce the density thereof. It is envisioned that the low density material may be in the fluid as formulated or the low density component may be added to the fluid during drilling to effectuate the reduced density.

The low density material may be added to the fluid at the surface and circulated down the drill string and up the annulus of the well bore. In some embodiments, the microsphere component is pumped in a fluid vehicle, such as water, and pressure injected into the annulus between the drill string and the well bore to reduce the density of the fluid that has been pumped from the surface down the drill string. In such a case, the microsphere component does not come into contact with the high shear environment of the drill bit. If desired, the microsphere component may be injected at multiple points along the annulus from the seabed to the surface.

In one or more methods of the present disclosure, the pressure of the wellbore fluid may be controlled to prevent blowouts, kicks or other uncontrolled pressure conditions. Under most well drilling applications in permeable formations, the drilling fluid pressure should be kept between pore pressure of the well and the fracturing pressure of the surrounding well formation. If the fluid pressure is too low, the formation fluid can force the fluid from the well-bore or annulus resulting in a kick or blowout. If the fluid pressure is too high the formation adjacent the well bore may fracture resulting in loss of fluid circulation and loss of fluid and cuttings to the fracture. In one or more embodiments, the low density materials may be particularly useful when drilling through depleted reservoirs. In particular, the fluids of the present disclosure may have particular use when the pore pressure is lower than $0.9*9.81*depth_{reseivoir}$.

EXAMPLES

Low density invert emulsion fluids were formulated with and without rheology modifiers (RHEFLAT PLUS NS and VERSAMOD, both of which are available from M-I SWACO). Other fluid components include ONE-MUL NS (an emulsifier available from M-I SWACO), BENTONE 128 (an organophilic bentonite), ECOTROL RD (a fluid loss control agent available from M-I SWACO), HGS19K46 hollow glass spheres (available from 3M), SAFE-CARD 2 and 10 (sized calcium carbonate available from M-I SWACO). The fluid formulations are shown in Table 1 below.

TABLE 1

| Product | Fluid with rheology modifiers Concentration [g/L] | Fluid without rheology modifiers Concentration [g/L] |
| --- | --- | --- |
| ESCAID 120 ULA | 436 | 436 |
| ONE-MUL NS | 20 | 20 |
| BENTONE 128 | 5 | 5 |
| ECOTROL RD | 15 | 15 |
| FRESH WATER | 61 | 61 |
| CaCl$_2$ powder 85% | 5 | 5 |
| RHEFLAT PLUS NS | 1, 5 | 0 |
| VERSAMOD | 1, 5 | 0 |
| hollow glass spheres HGS19K46 | 165 | 165 |
| OCMA BENTONITE | 10 | 10 |
| SAFE-CARB 2 | 40 | 40 |
| SAFE-CARB 10 | 40 | 40 |

Figure 2:
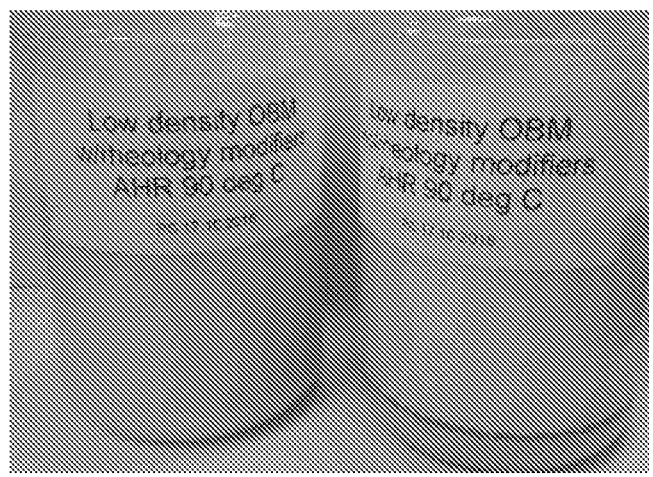
Figure 3:
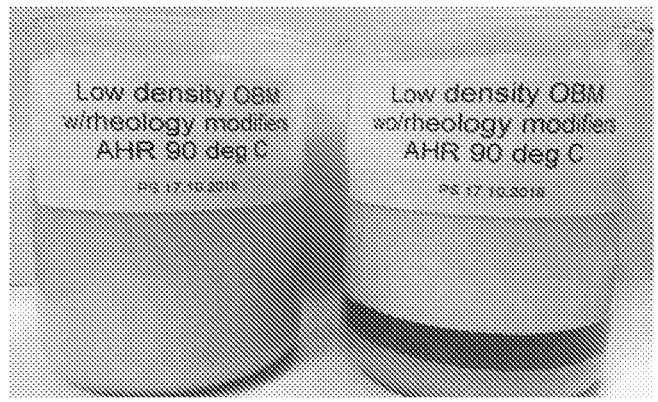

Upon formulation, the fluids were heat rolled at 90 degrees C. and then subjected to static to assess fluid stability. FIGS. 1-3 show images of the fluids after 0 hours, 48 hours, and 72 hours. As shown in the images, the fluid formulated without rheology modifiers had already begun to separate after 48 hours, with the separation being even worse after 72 hours. On the other hand, the fluid formulated with rheology modifiers showed no separation after the static aging.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A wellbore fluid, comprising:
   an oleaginous continuous phase;
   a non-oleaginous discontinuous phase;
   an emulsifier stabilizing the non-oleaginous phase within the oleaginous phase;
   a low density material in an amount to result in a specific gravity of the wellbore fluid that is less than 0.83; wherein the low density material comprises glass microspheres, and
   at least one rheology modifier to suspend the low density material within the wellbore fluid, wherein the rheology modifier comprises a dimer poly-carboxylic C12 to C22 fatty acid, a trimer poly-carboxylic C12 to C22 fatty acid, a tetramer poly-carboxylic C12 to C22 fatty acid, or mixtures of these acids.

2. The wellbore fluid of claim 1, wherein the at least one rheology modifier suspends the low density material in the wellbore fluid such that there is less than a 0.1 change in specific gravity in a column of the wellbore fluid when static for one hour.

3. The wellbore fluid of claim 1, wherein the wellbore fluid has a plastic viscosity of less than 40 cP.

4. The wellbore fluid of claim 1, wherein the wellbore fluid has a Fann 35 reading at 3 rpm ranging from 2 to 6 lbs/100 ft$^2$.

5. The wellbore fluid of claim 1, further comprising at least one of a fluid loss control agent, a bridging agent, and a viscosifier.

6. A method, comprising:
   circulating a wellbore fluid in a wellbore, wherein the wellbore fluid comprises:
   an oleaginous continuous phase;
   a non-oleaginous discontinuous phase;
   an emulsifier stabilizing the non-oleaginous phase within the oleaginous phase;
   a low density material in an amount to result in a specific gravity of the wellbore fluid that is less than 0.83; wherein the low density material comprises glass microspheres, and
   at least one rheology modifier to suspend the low density material within the wellbore fluid, wherein the rheology modifier comprises a dimer poly-carboxylic C12 to C22 fatty acid, a trimer poly-carboxylic C12 to C22 fatty acid, a tetramer poly-carboxylic C12 to C22 fatty acid, or mixtures of these acids.

7. The method of claim 6, wherein the wellbore fluid is circulated while drilling through a depleted reservoir.

8. The method of claim 6, further comprising stopping circulation of the wellbore fluid while the wellbore fluid is present in the wellbore.

9. The method of claim 8, wherein after stopping circulation of the wellbore fluid, the wellbore fluid has less than a 0.1 specific gravity change in the wellbore.

10. The method of claim 6, wherein the wellbore fluid has a plastic viscosity of less than 40 cP.

11. The method of claim 6, wherein the wellbore fluid has a Fann 35 reading at 3 rpm ranging from 2 to 6 lbs/100 ft$^2$.

\* \* \* \* \*